United States Patent Office 3,448,561
Patented June 10, 1969

3,448,561
ADSORBENT FRACTIONATOR WITH AUTOMATIC CYCLE CONTROL AND PROCESS
Chesterfield Franklin Seibert and Marcel G. Verrando, Jr., Cortland, N.Y., assignors to Pall Corporation, Glen Cove, N.Y., a corporation of New York
Continuation of application Ser. No. 439,294, Mar. 12, 1965. This application Sept. 5, 1967, Ser. No. 665,645
Int. Cl. B01d 53/04, 53/30
U.S. Cl. 55—20                                           18 Claims

ABSTRACT OF THE DISCLOSURE

A method and apparatus are provided for adsorbing water vapor from a mixture thereof with a second gas to reduce the water vapor concentration in the mixture to below a permissible maximum concentration. The advance of the leading edge of the moisture front in a sorbent bed is detected by sampling the gas sufficiently far from the end of the bed to prevent the moisture front from leaving the bed, using a gas sampling probe. When the moisture front reaches this point, the adsorption cycle is discontinued, and the bed regenerated.

---

This application is a continuation of application Ser. No. 439,294, filed Mar. 12, 1965, and now abandoned.

This invention relates to a process and apparatus for fractionating gases, employing a bed of adsorbent for this purpose, and more particularly to a process and apparatus for drying gases designed for efficient utilization of a desiccant bed by controlling the cycle time according to the moisture content of the desiccant.

Desiccant dryers have been marketed for many years and are in wide use throughout the world. The usual type is made up of two desiccant beds, one of which is being regenerated while the other is on the drying cycle. The gas to be dried is passed through the one desiccant bed in one direction in the drying cycle, and then, at a predetermined time interval, when the desiccant can be expected to have adsorbed so much moisture that there is a danger that the required low moisture level of the effluent gas will not be met, the influent gas is switched to the other bed, and the spent bed is regenerated by heating and/or by evacuation and/or by passing purge effluent gas therethrough usually in counterflow.

Desiccant dryers on the market today are of two general types, a heat-reactivatable type, in which heat is applied to regenerate the spent desiccant at the conclusion of the drying cycle, and a heatless dryer, in which heat is not applied to regenerate the spent desiccant at the conclusion of the drying cycle, but which relies upon the use of a purge flow of dry gas, usually effluent gas from the bed on the drying cycle, which is passed through the spent bed at a lower pressure, with rapid cycling to conserve the heat of adsorption to aid in the regeneration of the spent bed. The use of a purge gas to regenerate at a lower pressure than the line pressure of the gas being dried is not, however, confined to heatless dryer, but was used in heat-reactivated desiccant dryers for many years before the advent of the heatless type.

Both types of dryers are operated with fixed time drying and regenerating cycles, usually equal in duration, with the length of the cycles being fixed according to the volume of desiccant available and the moisture content of the influent air. The time of the cycle is invariably fixed at much less time than might be permitted, in order to ensure that the moisture content of the effluent gas will always meet the system requirements. As the drying cycle proceeds, the desiccant bed becomes progressively more and more saturated from the inlet end towards the outlet end, and less and less capable of adsorbing moisture that is carried through it by the influent gas. Removal of moisture from the influent gas depends upon the rate of flow of the gas and the rate of moisture adsorption and moisture content of the adsorbent, as well as the temperature and pressure of gas within the bed. The rate of adsorption by the desiccant may decrease as the desiccant becomes loaded. Since the moisture content of an influent gas is rarely constant, the demand put upon the desiccant bed can vary, sometimes rather rapidly, and sometimes within rather wide limits. Consequently, a fixed time drying cycle must always be short enough to give a safe margin for moisture removal at maximum moisture content of the influent gas, and this means that frequently a fixed timed cycle must be rather short, to be sure it is ended before the available remaining moisture capacity of the bed reaches too low a level. This means, of course, that in the average cycle, the moisture capacity of the bed may not be well utilized.

The life of a desiccant that is heated in order to regenerate it is to a considerable extent dependent upon the frequency of regeneration. It is a rule of thumb in the trade that a desiccant bed is good for a certain number of regeneration, and no more. Obviously, then, the effective life of a bed is shortened unnecessarily, whenever during each drying cycle the moisture capacity is not effectively utilized. Furthermore, the inability to achieve a full utilization of the effective bed capacity during each drying cycle, both in the case of heat-reactivated and heatless dryers, means that the volume of the desiccant bed must be more than what might be required, to provide the reserve capacity needed to adsorb extreme but occasional moisture levels of the influent gas during the fixed time period of the drying cycle.

Inefficient utilization of moisture capacity also leads to a considerable waste of purge gas with each cycle. Purge gas is normally bled off from the effluent gas, for the purpose of regeneration of a spent bed, and correspondingly reduces the yield of effluent. Each time a bed is transferred from the drying cycle to the regenerating cycle, a volume of purge gas equal to the open volume of the bed vessel is necessarily dumped, and lost. Short cycling means higher purge losses than long cycling.

Such losses are particularly severe in the case of heatless dryers, which require much more frequent cycling. Indeed, the choice between a heat-regenerated and a heatless dryer frequently is dictated by the frequency of re-cycling required. Skarstrom in U.S. Patent No. 2,944,627, dated July 12, 1960, describes a type of heatless dryer which purports to represent an improvement on those described some years earlier by Wynkoop, U.S. Patent No. 2,800,197, dated July 23, 1957, and in British Patents Nos. 633,137 and 677,150. Skarstrom showed that by very rapid cycling between adsorption and desorption in the respective zones, the desorption cycle could effectively utilize the heat of adsorption for regeneration of spent desiccant. Skarstrom accordingly taught the use of times in the adsorption cycle not exceeding two to three minutes, preferably less than one minute, and very desirably less than twenty seconds. Such cycling times are of course shorter than Wynkoop's which was of the order of thirty minutes or higher, as shown in the graph of FIGURE 2, or the cycling times ranging from five minutes to thirty minutes, of British Patent No. 633,137. British Patent No. 677,150 demonstrated that the adsorption and desorption cycles need not necessarily be equal.

The drawback of the Skarstrom system, however, is the very considerable volume of purge gas lost with each cycle, and this loss is very much greater at a cycling time of, for instance, ten seconds, as compared to the British patents' five to thirty minutes, and Wynkoop's thirty minutes or longer. In the short Skarstrom cycles, of course, the capacity of the desiccant bed is very little utilized, but when no heat is applied to effect regeneration of the desiccant, it becomes more important not to carry the moisture content of the adsorbent beyond a certain minimum on the adsorption cycle, or it will be impossible effectively to regenerate the adsorbent on the regeneration cycle.

Dryers have been provided with moisture detectors in the effluent line, to measure dewpoints in the effluent gas. Because of their slow response and relative insensitivity to low dewpoints, however, such devices have not been and cannot be used to determine the cycling of a dryer when an effluent of low dewpoint or relative humidity is desired, since by the time the detector has sensed moisture in the effluent, the front has broken through the bed.

In accordance with the instant invention, a process and apparatus for drying gases are provided which make it possible effectively to utilize the moisture capacity of a desiccant bed, by providing for regeneration thereof only when the moisture load on the bed requires it, and thus obtain optimum efficiency in use. During each adsorption cycle, the sorbent can be brought to the limiting moisture capacity at which regeneration can be effected under the available regenerating conditions, whether these be with or without the application of heat, and with or without the application of a reduced pressure. This is made possible in accordance with the invention by detecting the advance of the moisture front within the bed, as evidenced by the moisture content of the gas being dried, and halting the drying cycle whenever the front has reached a predetermined point in the the bed, short of breaking out of the bed. This can be done automatically by providing in the desiccant bed means for sensing the moisture content of the gas being dried, and means responsive to moisture content to halt the drying cycle whenever a predetermined moisture content in the gas being dried is reached at that point.

The advance of the moisture front in a bed of desiccant at it gradually adsorbs moisture is a well known phenomenon in the desiccant drying art, and is discussed in numerous patents, for example, Skarstrom Patent No. 2,944,627. During the greater part of the drying cycle, the sorbent efficiently sorbs moisture from gas passing over it. When the sorbent capacity of the desiccant approaches zero, however, the moisture content of gas passed over it rises sharp. If moisture content, dewpoint or relative humidity of the gas be measured, and plotted against time, this usually sudden rise in moisture content is noted as a change in slope, and the increasing moisture content then rapidly approaches the moisture content of the influent gas. The resulting S-shaped portion of this curve in effect represents the moisture front, and if this be observed in terms of the length of the bed, it will be found to progress from the influent end to the effluent end of the bed as the adsorption cycle proceeds. The objective is to conclude the cycle before the front or change in slope of the curve reaches the end of the bed, since thereafter the rise is so rapid that delivery of undesirably moist effluent can hardly be prevented.

In accordance with the invention, this is prevented by detecting the advance of the front at a point in the bed sufficiently spaced from the effluent end to permit terminating the drying cycle before the front reaches the effluent end. How this is done is best seen in reference to FIGURES 1 or 8.

Figure 1:
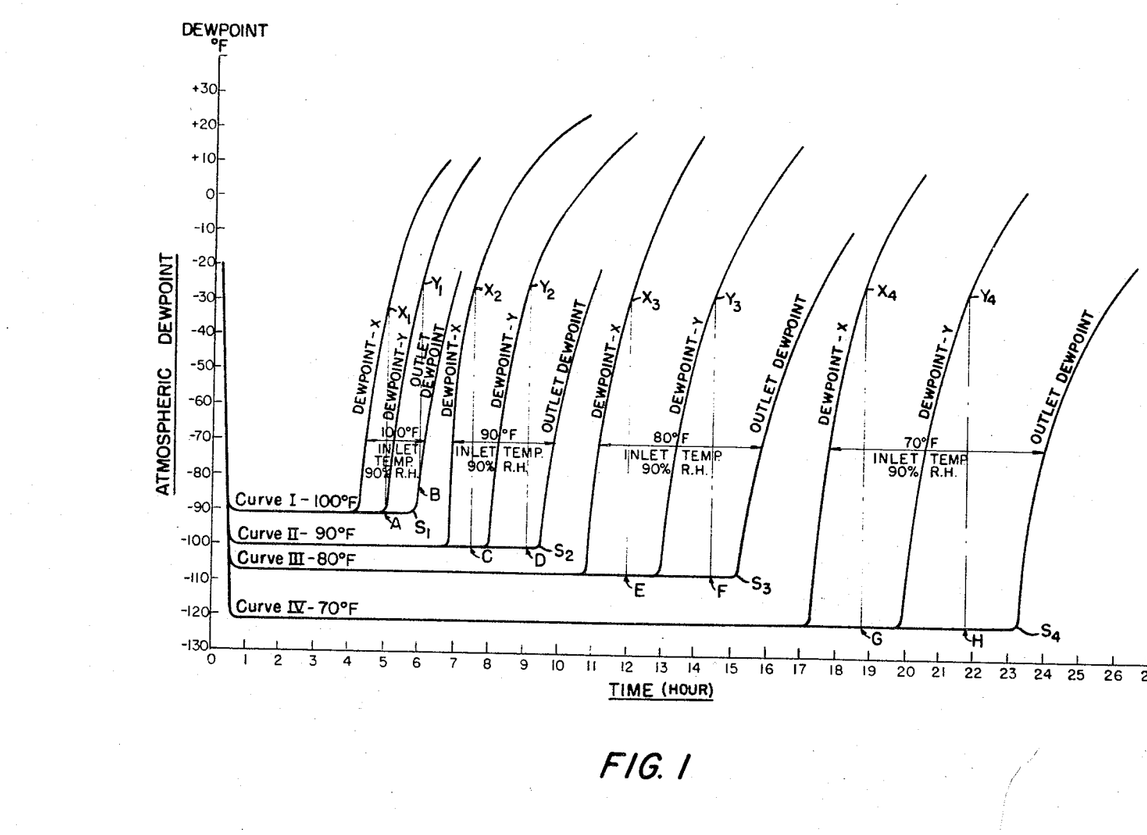

FIGURE 1 represents a series of curves for the drying of moist gas at 90% relative humidity at temperatures ranging from 100° F. to 70° F., plotting the dewpoint against time for gas being dried, detected at a series of points X 12 inches in from the effluent end of the bed, at a series of points Y 6 inches from the effluent end of the bed, and at the outlet from the bed.

Figure 8:
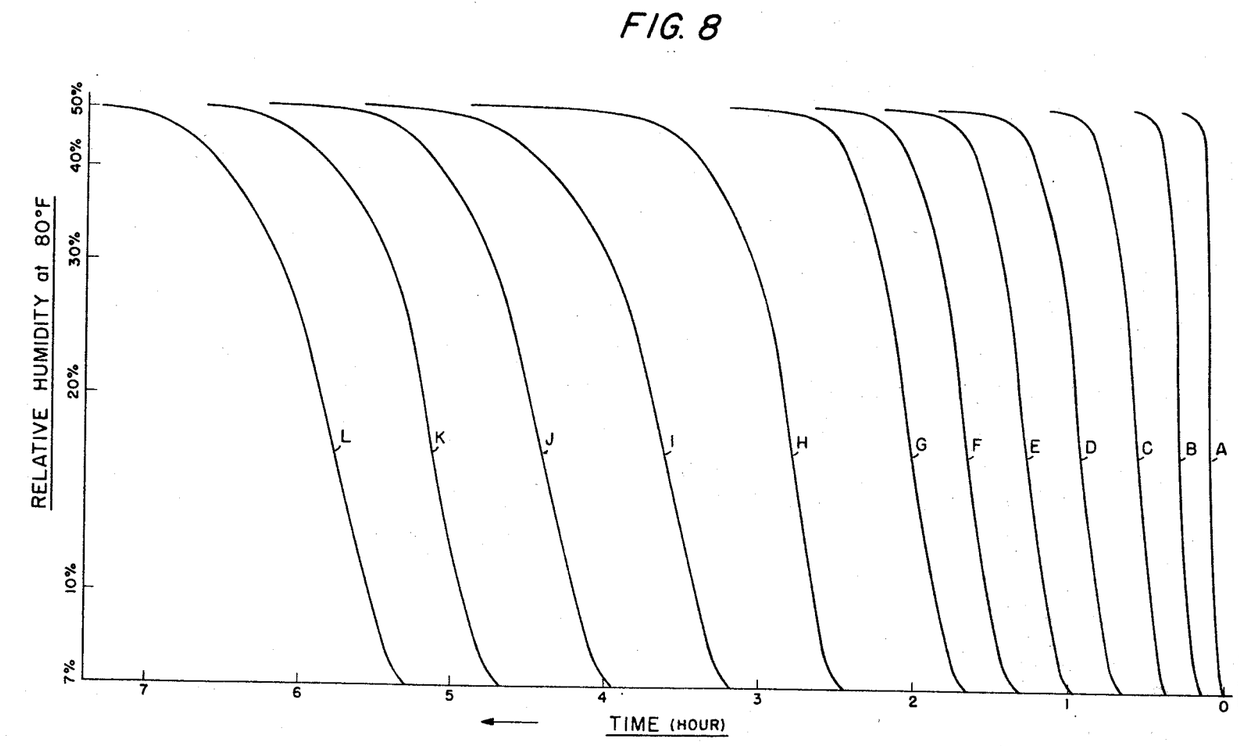

FIGURE 8 is similar, but was obtained using tweleve sensors at various points from end to end of the bed, and shows the progress of a moisture front from the inlet to the outlet of the bed at 90% relative humidity and 100° F.

The data for FIGURES 1 and 8 was obtained on air at a line pressure of 90 p.s.i.g. and a superficial flow velocity of 50 ft./min., using silica gel at the desiccant in a bed 54 inches long, and 12 inches in diameter. However, the data is typical of that obtainable using any desiccant under any adsorption conditions.

The principle of the process of the invention is to detect and halt the cycle before the change in slope S of the moisture front has reached the outlet, i.e., in FIGURE 1, before about 5½ hours cycle time for Curve I, about 9¼ hours cycle time for Curve II, about 15 hours cycle time for Curve III, about 23 hours cycle time for Curve IV, and in FIGURE 8, before about 5½ hours cycle time. The curves of FIGURE 1 show that this can be done by terminating the cycle in the case of Curve I whenever the dewpoint level at point $X_1$ in the bed rises from $-100°$ F. up to but not to exceed $-10°$ F., and at point Y, up to but not to exceed $-45°$ F. In the case of Curve II, the cycle is terminated whenever the dewpoint or moisture level has risen from $-90°$ F. up to but not to exceed about $+10°$ F. at point $X_2$ and about $-25°$ F. at point $Y_2$. On Curve III, the dewpoint are about $-15°$ F. at $Y_3$, and $+30°$ F. at $X_3$. On Curve IV, the dewpoints are $0°$ F. at $Y_4$ and $+30°$ F. at $X_4$. All of these dewpoints are susceptible of detection by available humidity sensing equipment.

The curves of FIGURE 1 show that the most rigorous conditions are at 100° F. and that a setting of the sensor that will terminate the cycle in time at 100° F. will also serve for gases at lower temperatures.

As a practical matter, it may be easier to select a sensor capable of detecting, say, a $-25°$ F. dewpoint. When such sensors are present at points X and Y in each of the drying cycles represented in FIGURE 1, the curves show the dewpoint of the effluent when the sensors are actuated. In the case of Curve I, sensor X is actuated at an effluent dewpoint A short of the moisture front's breaking out of the bed. However, sensor Y is not actuated in time, dewpoint B being beyond the change in slope $S_1$. In the case of Curves II, III and IV, sensor X is actuated at dewpoints C, E and G, and sensor Y at dewpoints D, F and H, all before the change in slope $S_2$, $S_3$, $S_4$, and thus in time to prevent the moisture front's leaving the bed.

Thus, in the process of the invention, the concentration of a first gas in a mixture thereof with a second gas is reduced to below a limiting maximum concentration thereof in the second gas, by passing the mixture in contact with and from one end to another end of bed of a sorbent having a preferential affinity for the first gas, adsorbing first gas thereon to form a gaseous effluent having a concentration thereof below the maximum, and forming a concentration gradient of first gas in the bed progressively decreasing from one end to the other end as the adsorption continues, and an increasing concentration of first gas in the second gas defining a concentration front progressively advancing in the bed from the one end to the other end as sorbent capacity therefor decreases, detecting the advance of the front in the bed, and then discontinuing passing the gaseous mixture in contact with the bed before the front can leave the bed, and the limiting maximum concentration of first gas in the second gas can be exceeded.

A preferred process in accordance with the invention employs a desiccant bed which on the regeneration cycle is heated to remove adsorbed moisture, but in which the application of heat for this purpose is restricted to those portions of the bed having a high moisture content, thereby saving time during the regeneration, and also avoiding the waste in application of heat where it is not required. In the preferred embodiment, heat is applied only in that portion of the bed in which the sorbent has adsorbed moisture to 20% or more of its moisture capacity, and preferably 50% or more of such capacity.

This invention is also applicable to systems wherein the entire desiccant bed is heated to effect regeneration, to systems wherein no heat is applied to effect regeneration, to systems wherein regeneration is effected at reduced pressure, and to systems utilizing a purge gas flow, and to systems combining one or more of these features.

As a further feature in accordance with the invention, since the regeneration cycle need not be and in most cases is not of a duration equal to the drying cycle, the bed being regenerated can be closed off, and heating, urge, evacuation, or whatever regeneration system is used discontinued when regeneration is complete. The remainder of the cycle time can be used for instance for cooling down of the regenerated bed, so that it is at a convenient and efficient temperature for adsorption when the flow of influent gas to that bed is resumed.

The drying apparatus in accordance with the invention comprises as the essential components a sorbent bed adapted for periodic and preferably counterflow regeneration, and one or a plurality of means in the bed for detecting the arrival of the moisture front therein at a point in the bed sufficiently distant from the effluent end thereof to enable termination of a cycle before the front can leave the bed.

Optionally, the apparatus includes means for applying heat during such regeneration. Such means preferably is limited to only that portion of the sorbent bed having a high moisture content, of the order of 20% of its moisture capacity or higher, at the conclusion of a drying cycle, i.e., to only that portion first contacted by influent flow during a drying or adsorption cycle. In this case, the remainder of the sorbent bed is not heated during regeneration, and consequently no heating means are provided therein. The unheated proportion of the bed volume can accordingly be as large as desired. Usually from one-fourth to three-fourths of the bed volume, preferably from one-third to two-thirds of the volume, will be heated.

In effect, the unheated portion of such a bed constitutes a reserve bed, which in the normal drying cycle may not be required at all, and in which in any case the sorbent is apt to adsorb only a relatively small proportion, less than 20%, of its capacity of moisture, but which is present in order to prevent the delivery of effluent gas of undesirably high moisture content in the unlikely event that moisture is not sufficiently adsorbed in the portion of the bed provided with heating means. The moisture-adsorbing capacity of the reserve portion of the bed is so little used that the reserve sorbent is regenerated by the purge flow, whether or not the purge flow is heated, and any moisture carried forward from this portion by purge flow therethrough is of course effectively removed from the bed after passage through the heated portion thereof.

While the apparatus of the invention can be composed of one desiccant bed, the preferred apparatus employs a pair of desiccant beds, disposed in appropriate vessels, which are connected to the lines for reception of influent gas to be dried, and delivery of effluent dried gas.

The drying apparatus can also include a check valve or throttling valve for the purpose of reducing pressure during regeneration, and multiple channel valves for cycling the flow of influent gas between the beds and for receiving the flow of effluent gas therefrom. In addition, a metering or throttling valve can be included to divert a portion of the dried effluent gas as purge in counterflow through the bed being regenerated.

The moisture sensing means can sense gas moisture at any portion in the desiccant bed. In some dryers, such as heatless dryers, which operate at very low total moisture levels on a desiccant bed per drying cycle, it may be desirable to place the probe very close to the inlet, say, from one-fiftieth of the length of the bed from the inlet, to half way down the bed. Usually, for optimum results, at flow rates of up to 150 ft./min., to ensure that a breakthrough of effluent of undesirably high moisture content is prevented, the gas is sampled at a point within the range from two-thirds to one-fiftieth of the length of the bed from the effluent or outlet end. If the moisture sensing means is sufficiently quick in response, however, or the permissible moisture content of the effluent sufficiently high, it can be placed adjacent the outlet port from the bed.

To some extent, the position of the sensing means in the bed is determined by the rate of flow of effluent gas through the bed, allowing the sensor time to react to the moisture content therein before the moisture front breaks through the bed. In general, the higher the rate of flow, the further the sensing means should be placed from the effluent end of the bed, so as to ensure that the moisture front is detected soon enough to prevent its leaving the bed and entering the system being conditioned.

The type of moisture sensing device and the position of its gas sampling probe in the bed will be selected to detect a moisture level in the gas being dried in time to give a signal before the moisture front can leave the bed. The margin of safety required for a particular system is easily determined empirically, obtaining data and plotting the curves shown in FIGURE 1 or FIGURE 8 for the particular system to be used. The one skilled in this art can do without the exercise of invention.

The moisture detecting device can be of any type known in the art. The device will usually include a sensing probe or gas sampling tube, or line, open to the desiccant bed or chamber at one end, and to the atmosphere at the other, with a humidity sensing component or sensor intermediate the two ends, which responds in a positive way to the moisture content of a gas. When the desiccant chamber is at a superatmospheric pressure, gas flow to the sensor is assured. A throttling valve can be used to control such flow, normally at the minimum for moisture detection. If the desiccant chamber is at a less than atmospheric pressure, a pump can be introduced to pass gas to the sensor.

The sensor responding to moisture content can be electrical or mechanical or chemical or any combinations thereof, but it is preferably arranged, responsive to moisture content, to signal or control suitable valving, so as to conclude the drying cycle, and switch the influent and effluent gases from one tank to the other, at the time the predetermined maximum moisture level in the effluent gas is reached.

The time required for the moisture content in the effluent gas to reach the predetermined level is directly correlated with the moisture capacity and moisture content of the sorbent. As the gas proceeds across the length of a desiccant bed, its moisture content is progressively diminished, according to the rate of adsorption of moisture by the desiccant. Since the rate of adsorption of moisture by the desiccant is dependent upon the moisture capacity, the gas pressure, the temperature and the rate of flow of gas, it will be apparent that for a given temperature and pressure of influent gas, the predetermined moisture level of the effluent gas will be reached only when the moisture load of the sorbent has also reached a predetermined level. Consequently, it is possible in accordance with the invention to adjust the drying cycle length almost precisely in accordance with the moisture content or load of the sorbent, and thus effectively utilize the moisture capacity thereof in each drying cycle, without however introducing a danger of breakthrough.

Consequently, the desiccant dryers in accordance with the invention operate to a predetermined moisture load on the desiccant during each drying cycle. This means that if the moisture level of the influent gas varies, the drying cycle length is also automatically adjusted accordingly. The result is that a drying cycle is not terminated until it is necessary to do so, and unnecessary regenerations of the desiccant are eliminated. It thus also becomes unnecessary to build in a reserve capacity of desiccant; since the drying cycle depends on the moisture capacity of the desiccant volume utilized, a smaller volume of desiccant than was formerly required will now be sufficient. At the same time, the volume of purge lost during each cycle is kept to an absolute minimum. In effect, the desiccant dryers of the invention automatically time their drying cycles according to the demand made upon them by the moisture content of the influent gas, and consequently the dryers in accordance with the invention are referred to as demand cycle dryers.

The regenerating cycle, on the other hand, need not be and preferably is not automatically the same in length of time as the drying cycle. Unlike most dryers, since the drying cycle can be very greatly lengthened, according to demand, the regenerating cycle is time-controlled, to end when regeneration is complete, even if the drying cycle continues. This also will ensure that the purge flow and energy used in any heating of the bed will not be wasted when no longer needed. The regeneration cycle can be linked to the humidity sensor, to end when the drying cycle ends, if this be before the timed regeneration cycle is completed, or the sensor can be linked to the regeneration cycle timer, to be ineffective to end the drying cycle until regeneration be complete. Which of these two systems is preferable will depend on the system conditions.

Any type of humidity or moisture level sensing component or sensor can be used in accordance with the invention. One type which is well known utilizes a lithium chloride cell to sense the moisture in a gas, and responds to changes therein by changes in electrical resistance or conductivity. Accordingly, an electric signal is given when the moisture content of the gas has reached the predetermined level, and this signal is utilized to switch the valve controlling ingress of influent gas to the one bed, and divert the influent gas to the other bed, to conclude the cycle, at the same time changing the flow of purge gas so that the spent bed can now be regenerated.

Another type of moisture sensor which can be used is the humidity sensing element of U.S. Patent No. 3,167,734, dated Jan. 26, 1965, and issued to Brucken and Williamitis. This device comprises a cylindrical support member having an integral annular flanged base portion with a first electrical terminal on the base portion, a second electric terminal on the base portion, and a plastic film on the support member including an electrolytic and a hygroscopic material. Mass ionization throughout the plastic film occurs when the film is exposed to moisture, and this leads to an electric response which is transmitted via the first and second electrical conductors through the valve control switch.

Also useful is the electric hygrometer system of U.S. Patent No. 2,943,245, which is based on the ability of a hygroscopic film to change its electrical resistance instantly with micro changes in moisture content of a gas. This detects from 1.5 to 97% relative humidities.

Another useful type employs the Peltier cooling effect to cool a rhodium plated mirror to the dewpoint, and a solid state optical system senses and proportionally controls the cooling rate of the mirror, causing the mirror to cool to the gas dewpoint, and continuously tracks this dewpoint. This detects dewpoints from $-100°$ to $+100°$ F.

An electrolytic cell type uses an epoxy cartridge that contains a glass tube through which the gas passes. Two platinum wires are wound in a double helix on the tube's inner surfaces with one space between them coated with $P_2O_5$. When moisture wets the $P_2O_5$, a measurable current is produced by a potential applied to the wires. The cell is regenerated continuously by electrolysis of the water.

Infrared analyzers also can be used. Two similar Nichrome filaments are used as sources of infrared radiation. Beams from these filaments travel through parallel cells, one the sample cell, and the other the comparison cell. The gas to be detected absorbs and thus reduces the beam of radiation to be detected from the sample cell. This is converted into an electric signal which is proportional to the difference in the two beams, and when this is calibrated, it enables a determination of the amounts of gas to be detected. This type is capable of sensing not only water vapor but also carbon dioxide, carbon monoxide, methane, ammonia, methylene chloride, ethane, cyclohexane, sulfur dioxide, ethylene, and others over ranges of from 0 to 100% concentration.

The apparatus of the invention is illustrated in the following drawings, in which.

Figure 2:
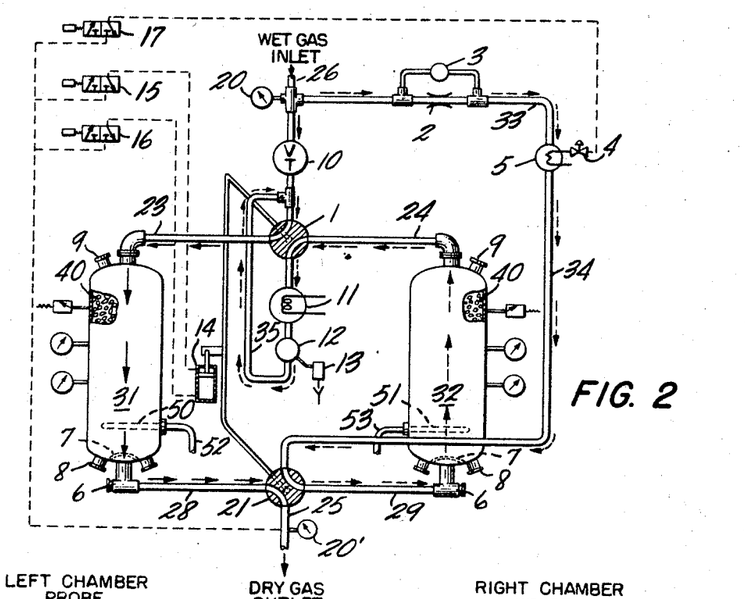
FIGURE 2 is a schematic view of a two-bed heat-reactivatable desiccant dryer in accordance with the invention.
Figure 3:
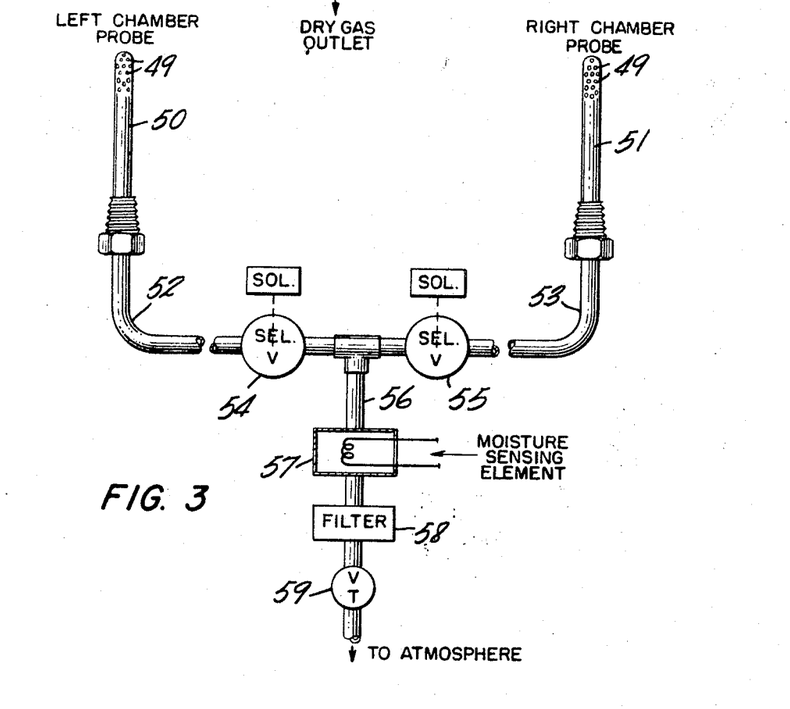
FIGURE 3 is a detail view of the moisture sensor circuit of the heat-reactivatable dryer in accordance with FIGURE 2.

The dryer of FIGURES 2 and 3 is composed of a pair of desiccant tanks 31 and 32. These tanks are disposed vertically. Each tank contains a bed 40 of desiccant such as silica gel. Also provided in tanks 31, 32 are desiccant fill and drain vents 8, 9 for draining and filling of desiccant in the tanks.

An extensive system of lines is provided, connecting the two tanks for introduction of influent gas containing moisture to be removed, and for delivery of dry effluent gas, freed from moisture after having passed through the dryer, with the necessary valves for switching flow of influent and effluent gas to and from each tank. This system includes an inlet line 26 fitted with an inlet pressure gauge 20. The line 26 conducts the moist influent gas through a side-stream throttle valve 10 to a four-way inlet switching valve 1. This valve directs the flow of influent gas to one of two inlet lines 23 and 24, leading the influent gas to the top of each tank.

At the bottom of each tank is a desiccant screen support 7 made of a sintered stainless steel mesh, retaining the desiccant bed 40 in the tanks 31 and 32. Outlet lines 28 and 29 from the bottom of tanks 31 and 32, respectively, lead to the four-way outlet switching valve 21. Valves 1 and 21 are operated together by the compressed air cylinder 14. Cylinder 14 is reciprocated by air pressure, controlled by the solenoid valves 15, 16.

Disposed in each outlet line 28 and 29 is filter screen 6, which is removable and is also made of sintered stainless wire mesh. This acts to retain any desiccant particles that might otherwise be carried out from the bed 40 past the desiccant support 7, to keep the outlet valve 21 and the remainder of the system clean of such particles. From valve 21 extends the dry gas effluent delivery line 25, to deliver the dried effluent gas from the dryer to the system being supplied therewith. In the line 25 is an outlet pressure gauge 20'.

Disposed within each tank at a point approximately six inches above the outlet lines 28 and 29 are each of a pair of moisture sensing gas probes 50 and 51, sampling the gas in the bed at that point, and conducting it, as is seen in FIGURE 3, via lines 52 and 53 past selector valves 54 and 55 to line 56, and thence to a sensor 57 for determination of moisture content therein, after which line 56 is vented through filter 58 and throttle valve 59 to atmosphere.

The moisture-sensing probes 50 and 51 are tubes, at the end of which is provided a plurality of holes 49 for entry of gas passing through the bed.

The throttle valve limits flow in lines 52, 53 and 56 to the minimum level for humidity sensing purposes, about ½ s.c.f.m. This sensor is set to respond to a moisture level at a point like X or Y of FIGURE 1, to prevent the moisture front from leaving the bed. For instance, if the maximum atmospheric dewpoint that can be tolerated in the effluent gas is −80° F., then the sensor is adjusted to detect and respond to a dewpoint of from −40° F. to 0° F., depending on the sensitivity of the sensor. The sensor shown is of the lithium chloride cell type, but any other type of sensor can be used.

A timer is provided (not shown) to actuate valves 15 or 16 at the end of a predetermined time interval. If it were not for the sensor, the timer would automatically actuate one of these valves to switch the valves 1 and 21 via air cylinder 14 at the conclusion of this time interval. However, the sensor 57 is connected to an electric relay (not shown) which, while the sensor is sensing dry air, permits the timer to complete its cycle, and then cuts it off before it can actuate either of valves 15 and 16. These, then, are not actuated until the sensor senses wet air of the predetermined moisture content, whereupon the timer is restarted, and one of valves 15 or 16 is promptly actuated to switch the valves 1 and 21 simultaneously. On the other hand, the sensor cannot terminate a cycle before the timer has timed out the predetermined cycle interval. This prevents cycling before regeneration can be completed.

As noted, interposed in lines 52 and 53 are two solenoid valves 54 and 55. These are also actuated by the timer. Both valves are closed during the first portion of a drying cycle, while the newly regenerated bed is still hot. The valve leading to the onstream bed is opened after the bed has cooled. The valve leading to the bed being regenerated is held closed during regeneration.

In order for a sensor to lock out the timer, the sensor must sense dry air. If it does not sense dry air, the timer is permitted to control the cycling. This means the sensor in effect is locked out, instead, which means that the system is not operating properly, for some reason. Hence, an alarm is put in the circuit to be actuated if during the entire drying cycle, from switching of the inlet and outlet valves 1 and 21 to the completion of the timer cycle, a sensor senses only wet air.

The dryer of FIGURES 2 and 3 is designed to regenerate a spent desiccant bed by a heated influent gas purge. For this purpose, a steam heater 5 is provided, connected by a line 33 with the wet gas inlet line 26 and via line 34 to outlet valve 21. Any type of heater can be used, for example, a gas heater, electric heater or hot water heater. A metering orifice 2, equipped with a side stream flow indicator 3, reduces pressure in line 33 to the heater 5, while the throttle valve 10 limits flow in line 26 to divert some influent gas for purge into line 33, and thus a limited portion of the wet gas influent is diverted through line 33 to the steam heater 5 at all times. Solenoid valve 17 controls the steam inlet valve 4 to the heater, which is closed whenever the dryer is shut down. From the heater 5, the line 34 leads to the four-way switching outlet valve 21, whence the heated purge gas is cycled to the bottom of either the one tank or the other via lines 28 or 29.

A feedback line 35 extends from inlet switching valve 1 to inlet line 26, for recycling purge gas to be dried, so that no purge gas is lost. Line 35 includes a cooler 11, a water separator 12, and an automatic water trap 13, for removing as much water as possible from the wet purge flow before recycling it for drying and reuse. A temperature gauge can be added in line 34 to detect the temperature of the purge gas for purge heat control.

The operation of the dryer is as follows. Wet gas influent at line pressure, 30 to 300 p.s.i.g., is introduced through line 26 to the four-way switching valve 1, where it is cycled to one of the tanks 31 or 32. If tank 31 is on the drying cycle, the four-way switching valve 1 is set to divert the influent gas through line 23 to the top of tank 31. The influent gas passes downwardly through the bed 40 to the bottom, the moisture being adsorbed on the desiccant as it does so, and the dry gas passes through the desiccant support 7 and filter 6 to and through the outlet line 28, through the four-way switching outlet valve 21, to the delivery line 25, where it emerges from the dryer.

As the gas flows through the bed 40, the water content of the gas flowing in the bed is continuously sensed by the probe 50, gas at a rate of ½ s.c.f.m. being conducted via holes 49 and probe tube 50 through line 52 and open valve 54 to the sensor 57, whence it is exhausted to atmosphere.

At the same time, a portion of the influent gas is diverted through the line 33 to the orifice 2 and thence to steam heater 5, where it is heated to a rather elevated temperature, of the order of 100° C. to 250° C., and is then conducted by the line 34 to four-way valve 21 which diverts it to the line 29, whence it enters the bottom of the second tank 32, past the desiccant support 7, passing upwardly through the desiccant bed 40 in that tank, and emerges from the tank through the line 24. This leads it to valve 1, which diverts it to line 35, past the cooler 11, where water is condensed out, and removed at separator 12 and trap 13, to the inlet line 26, where it rejoins influent flow for drying. Thus, no purge is vented.

The dryer continues on this cycle until the sensor 57 has sensed in the gas being dried in tank 31 the predetermined moisture level at which the front is about to leave the bed, whereupon the timer is reenergized and actuates valve 15 to reciprocate the piston of cylinder 14, switching valves 1 and 21 to the next 180° position. This diverts the influent gas entering via line 26 from line 23 to line 24, to enter the top of the second tank 32, and diverts purge flow to the bottom of tank 31 via line 28. Gas from the steam heater 5 is now conducted through the inlet line 28 at the bottom of tank 31 whence it passes upwardly through tank 31, emerging at the top of the tank, and being passed through line 23 and valve 1, to line 35, and thence, line 26. Valve 54 is closed at this time, closing off line 52 to sensor 57. Valve 55 and line 53 are opened only after the gas in tank 32 is cool, after which the sensor can sense moisture in the gas in tank 32. This cycle is then continued until the senor 57 has sensed the predetermined moisture level in the gas in tank 32, whereupon the timer is once more reenergized, and the valves 1 and 21 are turned 180° to their original position, and the first cycle repeated.

Figures 4, 5:
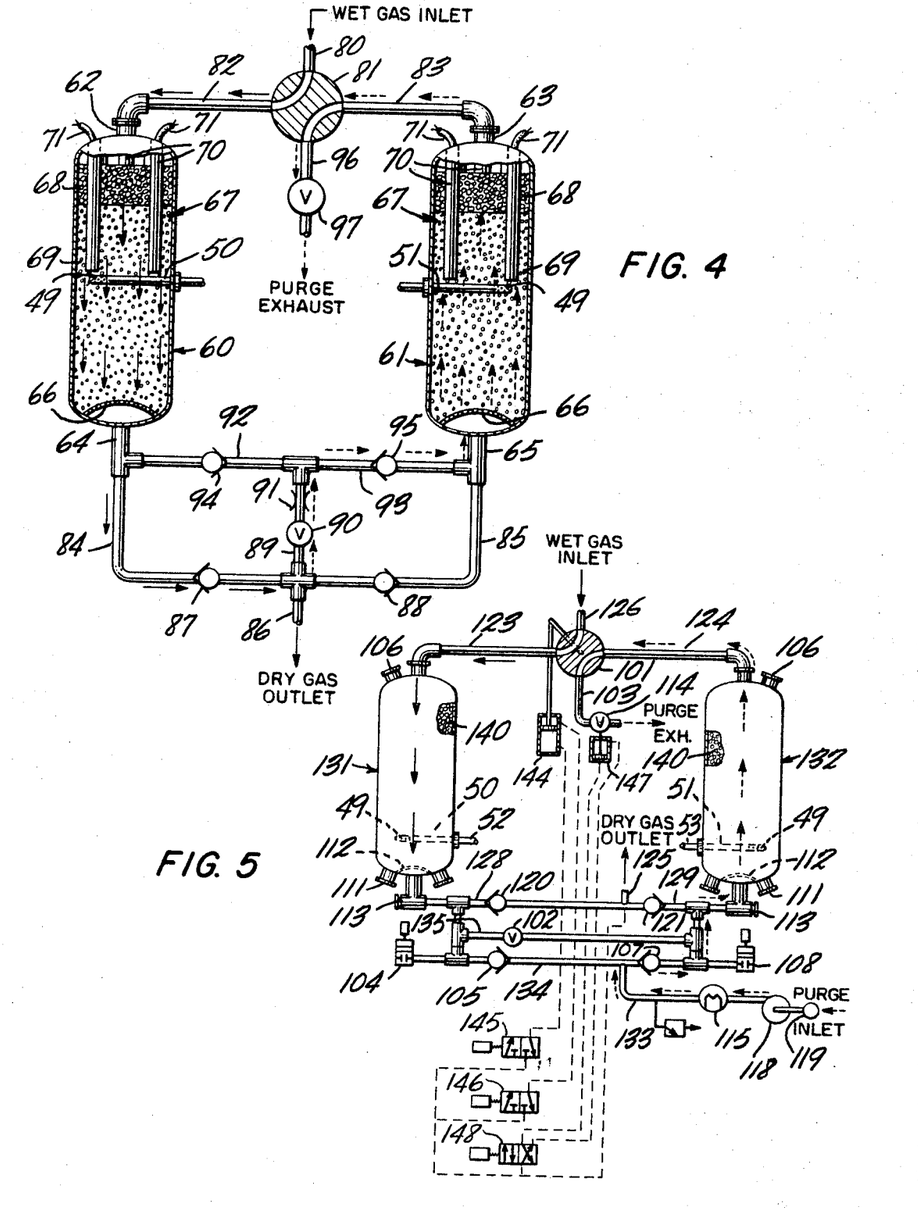
FIGURE 4 is a schematic view of another type of two-bed heat-reactivatable desiccant dryer in accordance with the invention.
FIGURE 5 is a schematic view of another type of two-bed heat-reactivatable desiccant dryer of the invention.

The dryer shown in FIGURE 4 is composed of a pair of tanks 60 and 61, each having at one end an inlet 62 and 63, and at the other end an outlet 64 and 65. Disposed across the outlets of each are stainless steel support screens 66, made of wire mesh or perforated steel plate, the purpose of which is to retain the desiccant particles within the tanks.

The tanks are filled with desiccant in two layers 68 and 69, the first buffer layer 68 extending approximately one-sixth the length of the bed, made up of activated alumina, and the second layer 69 composed of the remainder of the bed, made up of silica gel. The activated alumina has a higher resistance to free water than the silica gel, so it serves as a buffer for the silica gel at the inlet ends of the beds.

Disposed at the inlet end of each bed and extending approximately one-half of the length of the bed is an array of elongated heater elements 70, in this case eight in number. These are evenly spaced through the bed. However, it will be appreciated that a lesser or greater number of elements can be used, according to their heat capacity. The inlet ends of the heaters are provided with electrical connections 71, which extend through the walls of the tanks 60 and 61, and are connected to the electrical system in a manner such that the heaters are turned on when the bed is put on the regenerating cycle, and turned off at the end of a predetermined time, sufficient to effect regeneration of the desiccant, which may be less than the duration of the drying cycle, or which may be equal to the length of the drying cycle, depending upon the time required to activate the moisture sensor 57 via probes 50 and 51, as shown in FIGURE 3, disposed just below the heaters in each bed 67. The sensor 57 is connected in a circuit with a timer, exactly as in the apparatus of FIGURE 2.

The tanks 60 and 61 are interconnected by a system of lines, to ensure delivery of influent gas to be dried to the inlet of either bed, and the withdrawal of dried gas from the outlet of either bed, with lines for directing purge flow bled off from the effluent to the bottom of either bed for regeneration, and to vent it to atmosphere after leaving the top of each bed. This system is composed of a wet gas delivery line 80, which conducts wet gas to the four-way solenoid switching valve 81, and then through either line 82 or 83 to the top of tanks 60 and 61, respectively. Similar line connections 84 and 85 extend between the outlets of the two tanks. Flow along these lines to outlet line 86 is controlled by the check valves 87 and 88. Another line 89 leads from the junction of lines 84 and 85 to a purge-metering valve 90, which controls the volume of purge flow bled from the dry gas effluent for regeneration of the dryer bed on the regeneration cycle. The line 89 leads the purge flow through pressure-reducing orifice 91 to one of lines 92, 93 and check valves 94 and 95, to the outlets 64 and 65 of tanks 60 and 61. A purge exhaust line 96 leads from the four-way valve 81 past purge exhaust valve 97, to vent purge to atmosphere.

If tank 60 is on the drying cycle, and tank 61 on the regenerating cycle, then operation of the dryer is as follows: Wet gas at line pressure, 25 to 350 p.s.i.g., entering through line 80, is diverted by valve 81 into line 82 to tank 60, and passes thence downwardly through the layers 68 and 69 past the probe 50 to the outlet 64, whence it is conducted via line 84 through valve 87 to the outlet line 86. Valves 88 and 94 prevent flow in lines 85 and 92, respectively. A portion of the effluent, as controlled by the purge valve 90, is then passed through line 89, through orifice 91, where its pressure is reduced to atmospheric due to open exhaust valve 97, into line 93, through check valve 95 (valve 94 prevents flow in line 92) to the bottom 65 of the second tank 61, which is on the regeneration cycle, and it passes thence upwardly through the bed to the inlet 63 and thence through the line 83 to the four-way switching valve 81, and is vented to the atmosphere through the purge exhaust line 96 and valve 97.

The array of heaters 70 in tank 61 which is being regenerated is activated, and the desiccant bed is baked out while being subjected to the purge flow for the time required to fully regenerate the desiccant. This time may be considerably less than the drying cycle time, which of course is determined not by a fixed time cycle, but by the moisture level in the gas in the bed. Consequently, the heaters 70 are timed so as to be activated only for the time necessary to complete regeneration of the desiccant, and when this time has elapsed, they are automatically shut off. Purge flow of gas is continued only for a time sufficient to cool the desiccant bed to room temperature, at which temperature the adsorption is more efficient, and then it too is automatically shut off by closing purge exhaust valve 97, repressurizing the spent bed, readying it for the next cycle. Normally from a half-hour to two hours is adequate to effect complete regeneration of a spent bed, if the bed is heated by the heating elements to a temperature within the range from 100 to 250° C. However, other temperatures and times can of course be used, dependent upon the desiccant that is employed.

A portion of the gas in tank 60 is withdrawn through holes 49 into probe 50 and thence via line 52 to sensor 57. When the sensor 57 has sensed the predetermined moisture content in this gas, the timer is reenergized, and switches the four-way switching valve 81 so as to divert influent gas to line 83 to the top of the second tank 61 on the drying cycle, and opens purge exhaust valve 97. Purge flow now passes through line 89, orifice 91 and line 92 through valve 94 to the bottom of the tank 60, which is now on the regeneration cycle. At the time valve 81 is switched, the heaters 70 in bed 60 are turned on, heating the bed to reactivate the desiccant, and valve 54 is closed, cutting off the sensor 57 from gas in tank 60, and valve 55 is opened, connecting the sensor 57 to tank 61. This cycle continues until the sensor 57 senses the predetermined moisture level in tank 61, whereupon the valves 81, 97, 54 and 55 are again switched, and the cycle is repeated.

The dryer of FIGURE 5 is composed of a pair of desiccant tanks 131 and 132. These tanks are disposed vertically. Each tank contains a bed 140 of desiccant such as silica gel. Also provided in tanks 131, 132 are desiccant fill and drain ports 106, 111 for draining and filling of desiccant in the tanks.

An extensive system of lines is provided, connecting the two tanks for introduction of influent gas containing moisture to be removed, and for delivery of dry effluent gas, freed from moisture after having passed through the dryer, with the necessary valves for switching flow of influent and effluent gas to and from each tank. This system includes an inlet line 126 which conducts the moist influent gas to a four-way switching valve 101. Valve 101 is switched by air pressure, via cylinder 144, controlled by solenoid valves 145, 146, which are controlled by a timer, exactly as in the apparatus of FIGURE 2. Valve 101 directs the flow of influent gas to one of two inlet lines 123 and 124, leading the influent gas to the top of each tank. A purge exhaust line 103 extends to a purge exhaust valve 114, and then vents to atmosphere. Valve 114 is actuated by cylinder 147 which is controlled by solenoid valve 148.

At the bottom of each tank is a desiccant screen support 112, made of a sintered stainless steel wire mesh, retaining the desiccant bed 140 in the tanks 131, 132. Outlet lines 128 and 129 from the bottom of tanks 131 and 132, respectively, lead to the dry gas outlet line 125. Disposed in each outlet line 128 and 129 is a filter screen 113, which is removable, and is made of sintered stainless wire mesh. This acts to retain any desiccant particles that might otherwise be carried out from the bed 140 past the desiccant support 112, to keep the remainder of the system clean of such particles. Also in each line 128, 129 are outlet check valves 120, 121.

Disposed within each tank at a point approximately six inches above the outlet lines 128, 129 are moisture sensing gas probes 50, 51, as in FIGURE 3, sampling the gas in the bed at that point, and conducting it as is seen in FIGURE 3, via lines 52, 53 past selector valves 54, 55 to line 56 and thence to a sensor 57 for determination of moisture content therein, after which line 56 is vented through filter 58 and throttle valve 59 to atmosphere.

The two solenoid valves 54, 55 are actuated by a timing device, exactly as in the apparatus of FIGURE 2. These cut off flow of gas to the sensor during the regeneration of a tank.

The dryer of FIGURE 5 is designed to regenerate a spent desiccant bed by a heated influent gas purge. For this purpose, an electric heater 115 is provided, connected by a line 133 with the by-pass line 134, which extends between lines 128, 129, and includes a pair of purge flow check valves 105, 107 and a pair of dump valves 104, 108. A second by-pass line 135 with a repressurization valve 102 extends between the two ends of line 134. A purge blower 118 supplies atmospheric air via the blower suction filter silencer 119 to the heater 115.

The operation of the dryer is as follows. Wet gas influent at line pressure 25 to 300 p.s.i.g., is introduced through line 126 to the four-way switching valve 101, where it is cycled to one of the tanks 131, 132. If tank 131 is on the drying cycle, the four-way switching valve 101 is set to divert the influent gas through line 123 to the top of tank 131. The influent gas passes downwardly through the bed 140 to the bottom, the moisture being adsorbed on the desiccant as it does so, and the dry gas effluent passes through the desiccant support 112 and filter 113 to and through the outlet line 128 to the delivery line 125, where it emerges from the dryer, valves 121, 105, 102 and 104 being closed and preventing it from proceeding into lines 129, 134 and 135, or discharging to atmosphere.

As the gas flows through the bed 140, the water content of the gas flowing in the bed is continuously sensed by the probe 50, gas at a rate of ½ s.c.f.m. being conducted via holes 49 and probe tube 50 through line 52 and open valve 54 to the sensor 57, whence it is exhausted to atmosphere.

At the same time, a flow of purge gas is supplied by blower 118 to heater 115, where it is heated to a rather elevated temperature, of the order of 100° C. to 250° C., and is then conducted by the line 133 to by-pass line 134. Valve 105 is closed, which diverts the purge past valve 107 in line 134 to the bottom of the second tank 132, past the desiccant support 112, passing upwardly through the desiccant bed 140 in that tank, and emerges from the tank through the line 124. This leads it to valve 101 which diverts it to line 103, past the valve 114, where the spent purge is vented.

The tank 132 continues on this cycle until a timer, set for a predetermined time interval after which regeneration is complete, sends a signal to the blower 118 and heater 115, which are shut off, and then to solenoid valve 148, which actuates cylinder 147, which closes purge exhaust valve 114. The timer then opens solenoid-operated repressurization valve 102. This permits bed 132 to be repressurized. When the sensor 57 has sensed in the gas being dried in tank 131 the predetermined moisture level at which the front is about to leave the bed, valve 102 is closed, and solenoid valve 146 is actuated to reciprocate the cylinder 144 and switch valve 101 to the next 180° position, diverting the influent gas entering via line 126 from line 123 to line 124, to enter the top of the second tank 132. Dump valve 104 is then opened. After a sufficient time, usually about one minute, for the gas in tank 131 to vent through dump valve 104, sufficiently to reduce the pressure in the tank essentially to atmospheric pressure, dump valve 104 is closed, and purge exhaust valve 114 opened. Now purge flow proceeds via line 134 past valve 105 to the bottom of tank 131, passes upwardly through tank 131, emerging at the top of the tank, and being vented to atmosphere through line 123, valve 101, line 103 and valve 114. Valve 54 is closed at the time valve 101 is switched, closing off line 52 to sensor 57. After tank 132 has cooled, valve 55 and line 53 are opened, so the sensor can sense moisture in the gas in tank 132. This cycle is then continued until the sensor 57 has sensed the predetermined moisture level in the gas in tank 132, whereupon the valves are all returned to their original position, in stages allowing an intermediate repressurization and dump stages, as before, and the first cycle repeated.

Figures 6, 7:
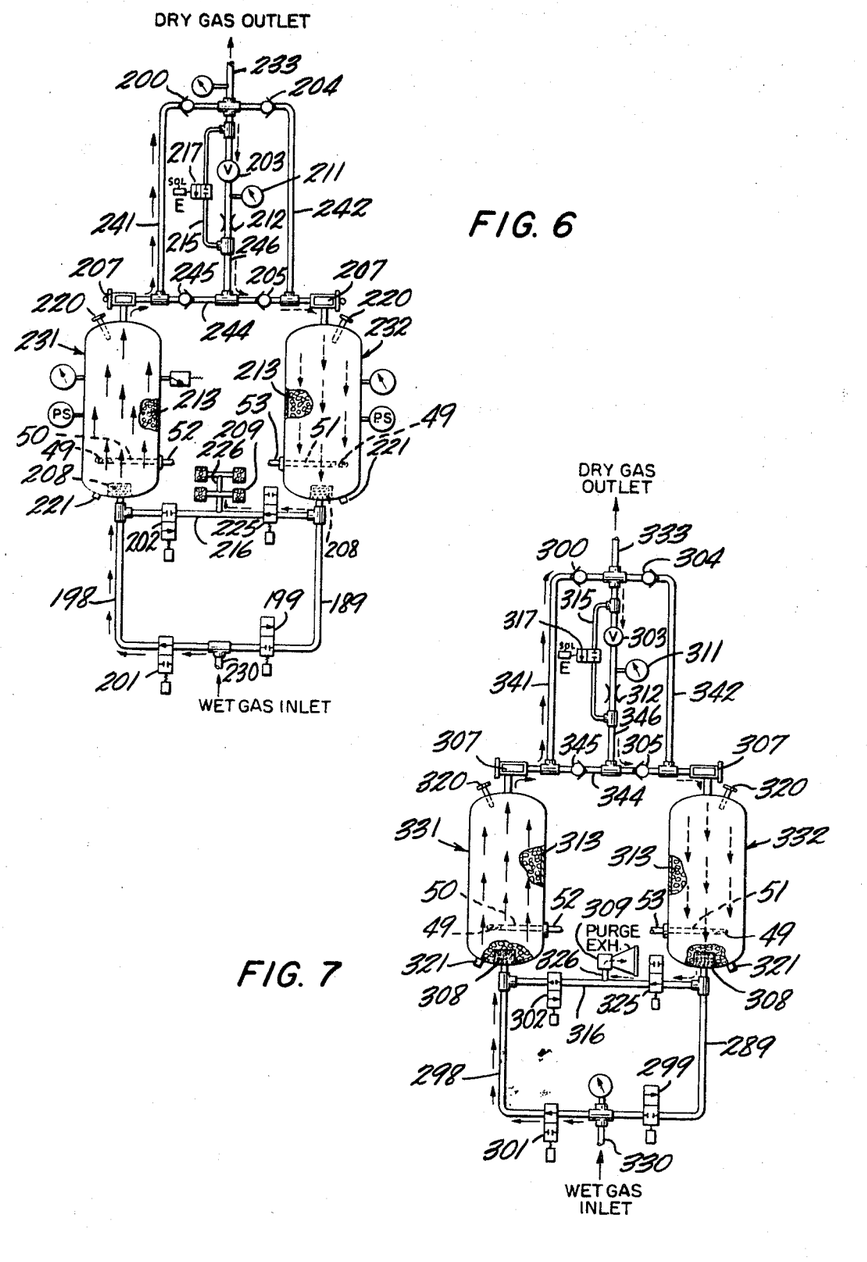
FIGURE 6 is a schematic view of a two-bed heatless desiccant dryer in accordance with the invention.
FIGURE 7 is a schematic view of another type of two-bed heatless desiccant dryer in accordance with the invention.

In the dryer shown in FIGURE 6, heat is not employed to effect regeneration of the spent desiccant.

The dryer is composed of two tanks, 231 and 232, fitted with suitable line connections for delivering wet gas influent and dry gas effluent to and from each tank, and with desiccant fill and drain ports 220 and 221, respectively. The desiccant 213 is supported on screen supports 208 in each tank. Control of wet gas influent flow from inlet line 230 is by valves 201 and 199, which direct the flow of influent gas either to line 198 or to line 189, and thence to the bottom of the tanks 231, 232.

Dry gas effluent leaves the tanks via one of lines 241 or 242, both of which are connected to the dry gas outlet 233. In each line is a cleanable filter of sintered stainless steel wire mesh 207, and a check valve 200, 204.

A cross line 244 bridges the outlet lines 241, 242, and is fitted with two check valves 205, 245 on either side of a parallel line 246 extending to the outlet line 233. In line 246 is a pressure-reducing orifice 212, beyond which pressure is reduced to atmospheric, when purge exhaust valves 202 or 225 are open, and purge adjusting valve 203 for metering flow through line 246. This controls the volume of purge flow bled off the effluent gas for regeneration of the spent tank, which is read off from purge flow indicator 211.

A by-pass line 215 by-passes the purge flow orifice 212 and adjusting valve 203, for repressurization, controlled by valve 217. Another line 216 extends between lines 198 and 189, and is fitted with purge exhaust valves 202 and 225, respectively, which vent purge to the atmosphere with open, through the exhaust mufflers 209, in line 226.

At points approximately six inches from the inlet of each tank are a pair of humidity sensing probes 50, 51, as in FIGURE 3. Moisture-laden gas is conveyed via lines 52, 53 to a humidity sensor 57, which detects the moisture level therein, and responds thereto when a predetermined moisture level is reached, and controls the timer, which controls operation of the valves 201, 199 and also the purge exhaust valves 202, 225 and repressurization valve 217.

If the left-hand tank is on the drying cycle, and the right-hand tank on the regenerating cycle, then the operation of the dryer proceeds as follows: Wet gas influent at, for example, 100 p.s.i.g., and a flow rate of 305 s.c.f.m., saturated at 80° F., enters through the inlet 230 into the line 198, passes the valve 201, and enters the bottom of the first tank 231, and thence upwardly through the bed of desiccant 213 therein, for example, silica gel, past the humidity sensing probe 50 to the outlet, and thence through filter 207, line 241 (check valve 245 preventing entry into line 244), and through check valve 200 to the dry gas outlet line 233. Effluent gas is delivered there at 100 p.s.i.g. and 265 s.c.f.m., dewpoint −100° F. Check valve 204 prevents entry of dry gas into line 242. The remainder of the dry gas effluent, 40 s.c.f.m., in this example, is bled off through the line 246 from the end of line 241 at the outlet and conducted past valve 203 and orifice 212, where its pressure is reduced to atmospheric, and then through line 244 to the top of the second tank 232, which is on the regeneration cycle. Purge flow passes downwardly through the desiccant bed 213, and emerges at the bottom into line 216, and thence passes through purge exhaust valve 225 to line 226 and mufflers 209, where it is vented to the atmosphere.

Since the time that each bed will be on the drying cycle is normally much greater than the length of time required to regenerate the spent bed, purge exhaust valves 202, 225 are timed so as to be actuated only for the time necessary to complete regeneration of the desiccant. When this time has elapsed, they are automatically shut off, and repressurizing valve 217 is automatically opened. This is done by a timer, as in the apparatus of FIGURE 2.

This cycle continues until the humidity sensor 57 via probe 50 has detected the predetermined moisture level in the gas in the tank 231, whereupon the timer is re-energized, and first closes valve 217, then opens valve 199, and then closes valve 201, and then opens valve 202, so that wet gas influent entering through inlet 230 passes through line 189 to tank 232, while dry gas effluent can now pass from the top of the tank 232 to the dry gas delivery line 233, and entry of dry gas into lines 241 and 244 from line 242 is prevented. The flow of purge gas in the cross-line 244 is now reversed, and purge flows in line 244 through valve 245 to the top of tank 231 which is on the regeneration cycle, and thence downwardly through the bed to the line 198, and thence through valve 202 and line 216, line 226 and mufflers 209, where it is vented to the atmosphere. This cycle continues until the predetermined regeneration time cycle is completed, whereupon the timer closes purge exhaust valve 202 and opens repressurizing valve 217 to repressurize tank 231. The system continues with tank 232 on the drying cycle until the humidity sensor 57 via probe 51 in tank 232 senses the predetermined moisture level in the gas in this bed, whereupon the timer is reenergized, the valves reversed, and the cycle begun again.

Usually, the drying cycle is carried out with gas at a superatmospheric pressure, of the order of 15 to 350 p.s.i.g. The orifice 212 in the cross-line 246 in combination with the purge exhaust valves 202 and 225 ensures that the regeneration cycle is carried out at a pressure considerably reduced from that at which the adsorption cycle is effected.

To ensure regeneration of the spent bed during the regenerating cycle, the time allotted by the timer and the volume of purge flow are adjusted according to the volume of desiccant, the moisture level at which the cycle is terminated, and the pressure at which the adsorption is effected, to ensure that regeneration can be complete within the allotted cycle time. Heatless dryers operate under equilibrium conditions, and the equilibrium conditions must be maintained under all of the conditions to which the dryer may be subjected in use.

In the dryer shown in FIGURE 7, heat is not employed to effect regeneration of the spent desiccant, and a steam ejector is used to reduce pressure below atmospheric during regeneration.

The dryer is composed of two tanks, 331 and 332, fitted with suitable line connections for delivering wet gas influent and dry gas effluent to and from each tank, and with desiccant fill and drain ports 320 and 321, respectively. The desiccant 313 is supported on screen supports 308 in each tank. Control of wet gas influent flow from inlet line 330 is by valves 301 and 299, which direct the flow of influent gas either to line 298 or to line 289, and thence to the bottom of tanks 331, 332.

Dry gas effluent leaves the tanks via one of lines 341 and 342, both of which are connected to the dry gas outlet 333. In each line is a cleanable filter of stainless steel wire mesh 307, and a check valve 300, 304.

A cross line 344 bridges the outlet lines 341, 342, and is fitted with two check valves 305, 345 on either side of a parallel line 346 extending to the outlet line 333. In line 346 is a pressure-reducing orifice 312 beyond which pressure is reduced to below atmospheric, when purge exhaust valves 302 or 325 are open, and purge adjusting valve 303 for metering flow through line 346. This controls the volume of purge flow bled off the effluent gas for regeneration of the spent tank which is read off from purge flow indicator 311.

The by-pass line 315 by-passes the purge flow orifice 312 and adjusting valve 303, for repressurization of a regenerated tank, controlled by valve 317. Another line 316 extends between lines 298 and 289, and is fitted with purge exhaust valves 302 and 325, respectively, which control the venting of purge flow to the atmosphere through the steam ejector 309 in line 326.

At points approximately six inches from the inlet of each tank are a pair of humidity sensing probes 50, 51, as in FIGURE 3, holes 49 for entry of gas passing through the desiccant beds in each tank. This moisture-laden gas is conveyed via lines 52, 53 to a humidity sensor 57, exactly as in FIGURE 3, and responds thereto when a predetermined moisture level is reached, and controls the timer which controls the operation of the valves 301, 299 and also the purge exhaust valves 302, 325 and repressurization valve 317.

If the left-hand tank is on the drying cycle, and the right-hand tank on the regenerating cycle, then the operation of the dryer proceeds as follows: Wet gas influent at, for example, 25 p.s.i.g., and a flow rate of 305 s.c.f.m., enters through the inlet 330 into the line 298, passes the valve 301, and enters the bottom of the first tank 331, and thence upwardly through the bed of desiccant 313, therein, for example, silica gel, past the humidity sensing probe 50 to the outlet, and thence through filter 307 line 341 (check valve 345 preventing entry into line 344), and check valve 300 to the dry gas delivery line 333. Effluent is delivered there at 25 p.s.i.g. and 267 s.c.f.m. Check valve 304 prevents entry of dry gas into line 342. The remainder of the dry gas effluent, 38 s.c.f.m., in this example, is bled off through the line 346 from the end of line 341 at the outlet and conducted past valve 303 and orifice 312, where its pressure is reduced due to the exhaust of the steam ejector 309 to less than atmospheric, 5 p.s.i.a., for this example, and then through line 344 to the top of the second tank 332, which is on the regeneration cycle. Purge flow passes downwardly through the desiccant bed 313, and emerges at the bottom into line 316, and thence passes through purge exhaust valve 325 to line 326 and ejector 309, where it is ejected to the atmosphere.

At the end of a predetermined time, purge valve 325 is closed and repressurizing valve 317 opened by the timer, as in the apparatus of FIGURE 6.

This cycle continues until the humidity sensor 57 via probe 50 has detected the predetermined moisture level in the gas in the tank 331, whereupon the timer is reenergized, and first closes repressurizing valve 317, opens valve 299, then closes valve 301 to switch flow from the bottom of the tank 331 to the bottom of tank 332 via line 289, and then opens valve 302, so that dry gas effluent can now pass from the top of the tank 332 to the dry gas delivery line 333, and entry of dry gas into lines 341 and 344 from line 342 is prevented. The flow of purge gas in the cross-line 344 is now reversed, and purge flows in line 344 through valve 345 to the top of tank 331, which is on the regeneration cycle, and thence downwardly through the bed to the line 298, and thence through line 316 through open purge exhaust valve 302, line 326 and steam ejector 309, where it is ejected to the atmosphere. This cycle continues exactly as in the apparatus of FIGURE 6, after which the valves are reversed, and the cycle begun again.

Usually, the drying cycle is carried out with gas at an atmospheric pressure or above, of the order of 15 to 350 p.s.i.a. The orifice 312 in the cross-line 346 in combination with the steam ejector 309 and exhaust valves 302 and 325 ensures that the regeneration cycle is carried out at a pressure considerably reduced from that at which the adsorption cycle is effected, say, from 0.5 to 15 p.s.i.a.

Two ensure regeneration of the spent bed during the regenerating cycle, the time allotted by the timer is adjusted, together with the volume of purge flow according to the volume of desiccant, the moisture level at which the cycle is terminated and the pressure at which the desorption is effected, to ensure that regeneration can be complete within the allotted cycle time. Heatless dryers operate under equilibrium conditions, and the equilibrium conditions must be maintained under all of the conditions to which the dryer may be subjected in use.

In most systems, it is of course important that wet gas effluent never be delivered, even should the humidity sensing element fail for some reason. Consequently, it is desirable to incorporate a fail-safe system in combination with the humidity detector. This is done by arranging the humidity sensing element to override a timed cycle control, as heretofore described.

Inasmuch as the humidity sensing element is operated by gas drawn from the desiccant bed, there is a possibility of contamination of the sensor, with resultant failure. In this case, the contaminant would be read as moisture by the sensor, and thus the error would be on the side of shortening the drying cycle, and not lengthening it. If the contamination is sufficiently severe, so as to cause the sensor to fail, then at the conclusion of the drying cycle, which is foreshortened under such circumstances, the bed will be put on the regenerating cycle, and then, since the sensor will never sense dry air due to the contamination, the alarm eventually will be sounded when the time cycle control comes into operation, and the system will revert to the predetermined time cycle.

In this way, a fail-safe mechanism is provided to ensure continued operation at an acceptable time cycle, despite failure of the humidity sensing element.

Because humidity sensing elements are heat-sensitive, it is usually desirable to cut off the line leading to the sensor from the bed if the bed is heated for regeneration. It is always desirable also to close off the line to the bed that is off stream. For this purpose, a solenoid valve is usually provided as shown in the drawings in the line leading from the humidity sensing probe to the sensing element, and this valve can be arranged to be closed automatically whenever the gas reaching it is at or above a predetermined temperature, and to be opened automatically when the temperature has decreased to below this temperature.

The dryer systems of the invention can be used with any type of sorbent adapted to adsorb moisture from gases. Activated carbon, alumina, silica gel, magnesia, various metal oxides, clays, fuller's earth, bone char, and Mobilbeads, and like moisture-adsorbing compounds can be used as the desiccant.

Molecular sieves also can be used, since in many cases these have moisture-removing properties. This class of materials includes zeolites, both naturally-occurring and synthetic, the pores in which may vary in diameter from the order of several angstrom units to from 12 to 15 A. or more. Chabasite and analcite are representative natural zeolites that can be used. Synthetic zeolites that can be used include those described in U.S. Patents Nos. 2,442,191 and 2,306,610. All of these materials are well known as desiccants, and detailed descriptions thereof will be found in the literature.

The dryers described and shown in the drawings are all adapted for purge flow regeneration with the purge passing in counterflow to the wet gas influent. This, as is well known, is the most efficient way of utilizing a desiccant bed. As a wet gas passes through a desiccant bed in one direction, the moisture content of the desiccant progressively decreases, and normally the least amount of moisture will have been adsorbed at the outlet end of the bed. It is consequently only sound engineering practice to introduce the regenerating purge gas from the outlet end, so as to avoid driving moisture from the wetter part of the bed into the drier part of the bed, and thus lengthen the regeneration cycle time required. If the purge flow be introduced at the outlet end, then the moisture present there, although it may be in a small amount, will be removed by the purge flow and brought towards the wetter end of the bed. Thus, the bed is progressively regenerated from the outlet end, and all the moisture is carried for the least possible distance through the bed before it emerges at the inlet end.

Nonetheless, for some purposes, it may be desirable to run the purge flow in the same direction as the influent flow. In accordance with the invention, it is possible to carry the moisture content of the desiccant to a very high level, much higher than is normally feasible, because of the protecting action of the humidity sensing element, which makes it possible to cut off flow at a time more precisely gauged to moisture level than has heretofore been possible. Consequently, in many cases if the bed is brought nearly to the saturation point throughout, it will make little difference if the purge flow enters at the influent end or at the outlet end, and the invention contemplates both types of operation, although of course counterflow regeneration is preferred in most cases.

The drying apparatus illustrated in the drawings each employ one humidity sensing probe per tank. However, it is also possible to employ two, three or more of such probes per tank. This will ensure operation of the device despite failure of one or more probes in the group. The humidity sensing probes can be placed at different levels in the desiccant bed, so as to follow the passage of the moisture front progressively through the bed. As stated previously, as the drying cycle continues, the moisture front gradually moves from the inlet end towards the outlet end of the bed. Therefore, the passage of the front will of course actuate a probe further from the outlet end sooner than a probe nearer the outlet end. Two probes spaced at a significant distance from each other will actuate at different times, and this fact can be used to actuate different stages of the cycle, such as regeneration and repressurization, at different times.

Thus, it is possible to employ one probe at a point spaced a considerable distance from the outlet end of the bed, say, halfway down the bed, to detect the front at time A of the cycle, and actuate the cutting-off of the heaters in the bed being regenerated, for example, so that these are cut off early enough to ensure cooling of the bed on the regenerating cycle before it is put on the drying cycle. A second intermediate probe can be used to actuate closing of the purge exhaust valves, and repressurize the regenerated bed. A third probe at the far end of the bed may actuate the switching of the cycle switches, and terminate the drying cycle. In this case, of course, no timer is needed, and the regeneration cycle time is determined not by a timer but by the sensor.

The probe within the desiccant bed can be at any depth within the diameter of the bed, but the distance from the outlet is dependent on the gas velocity and temperature which influence the rate of travel and the contour of the moisture front in the bed. Other factors discussed previously are moisture content of the influent gas and the moisture content or level at which the humidity sensor is actuated.

The humidity sensing element can be arranged to detect any desired moisture level. However, instruments to detect very low dewpoints or relative humidities are rather costly, so normally the instrument will be adapted to detect a moisture content in the range above about $-30°$ F. dewpoint, because reliable and inexpensive devices are available to detect moisture levels in this range. Equipment is available however, to detect dewpoints below $-100°$ F. and these can be used, if desired or required. The moisture level for the dry gas effluent from the desiccant bed is not normally below and about $-130°$ F. dewpoint at the outlet end of the bed.

The precise location of the probe in the bed is determined by one of two factors, the length of time to regenerate the bed, and the prevention of effluent dewpoint breakthrough. Clearly, the probe must be located and adjusted so that the probe will sense a high dewpoint befort the effluent dewpoint becomes excessive, under most adverse conditions of influent flow rate, humidity and temperature. This may be done as shown in FIGURE 1. However, the probe must also be located so that the amount of water required to saturate a bed sufficiently to actuate the sensing element can be desorbed in the regeneration time cycle provided. Thus, in a dryer where the regeneration time increases disproportionately with increased water content in the bed, such as a heatless type, the probe will be moved closer to the inlet and the bed considered spent at a lower total moisture content in the bed than in a heated dryer.

As stated previously, taking the above factors into consideration, the proper positioning of the probe for detection of the moisture front at the proper time for terminating a drying cycle under any given adsorption conditions can be determined empirically, obtaining and graphing dewpoint-time or relative humidity-time data for the drying apparatus, as illustrated in FIGURE 1.

The following examples in the opinion of the inventors represent a preferred method of operation of a dryer system in accordance with the invention:

EXAMPLE 1

A two bed heat-reactivatable dryer of the type shown in FIGURE 5, having two desiccant beds 54 inches long and 12 inches in diameter, containing in a first layer adjacent the inlet end 10 lbs. of activated alumina, and then in a second layer 148 lbs. of silica gel, was used to dry air at 90% relative humidity, 100° F. to 70° F., and 90 p.s.i.g. inlet pressure. The superficial flow velocity of the air was 50 feet per minute. Two humidity sensors, X and Y, actuatable at about 3% relative humidity were placed in the bed, X at 12 inches and Y at 6 inches from the outlet end of the bed, and one humidity sensor Z was placed at the outlet from the bed. The following are the data for four drying cycles carried out using this apparatus under these conditions, in each case terminating the drying cycle when sensor Y was alarmed:

TABLE I

| Curve | Inlet temp.(° F.) | Time to alarm at sensors (hrs.) | | Effluent dewpoint (° F.) | | |
|---|---|---|---|---|---|---|
| | | X | Y | Short of run | Time X alarmed | Time Y alarmed |
| 1 | 100 | 5 | 6 | −91 | −91 | −84 |
| 2 | 90 | 7.5 | 9.1 | −100 | −100 | −100 |
| 3 | 80 | 12 | 14.5 | −107 | −107 | −107 |
| 4 | 70 | 18.8 | 21.8 | −121 | −121 | −121 |

It is apparent from the data that the humidity sensors X and Y each alarmed at a time to terminate the drying cycle at a safe moisture level in the effluent gas. It is also clear from the different times of the cycle that the sensor made it possible to adjust cycle length to match variation in moisture level of the influent air, and thus preserve desiccant life by cutting down the number of regenerations materially. In order to ensure delivery of effluent gas of the proper moisture level, had this dryer been on a timed cycle interval, it would have been necessary to set the cycle interval at 5½ hours, to prevent breakthrough at 100° F. as shown in Curve I, since if it had run beyond this, the moisture level of the effluent gas might have exceeded the requirements. This would have meant that the dryer bed would have been reactivated prematurely in the case of Curves II, III, and IV. As can be seen from FIGURE 1, the cycle time can be extended to as high as 22 hours, if air at 70° F. and accordingly less moisture is introduced. It is apparent that as the moisture content of the influent air is reduced further, cycle time will be extended accordingly. Times as high as 300 hours and more are possible.

EXAMPLE 2

A two bed heat-reactivatable dryer of the type shown in FIGURE 5, having two desiccant beds 54 inches long and 12 inches in diameter, containing in a first layer adjacent the inlet end 10 lbs. of activated alumina, and then in a second layer 148 lbs. of silica gel, was used to dry air at 90% relative humidity, 100° F. and 90 p.s.i.g. inlet pressure. The flow rate was 277 s.c.f.m., equal to a superficial flow velocity of 50 feet per minute. Twelve humidity sensors, A to L, spaced three to six inches apart, as shown in Table II, sensing between 5 and 50% relative humidity were placed in the bed. One humidity sensor M was placed at the outlet from the bed. These were used to detect the progress of the concentration gradient from the inlet to the outlet of the bed by measuring relative humidity of the gas at each point. The relative humidity data obtained was graphed against time, as shown in FIGURE 8. Effluent dewpoint was too low to be graphed, but effluent moisture in p.p.m. is given in Table III, against time.

Table II

| Inches from inlet: | Sensor |
|---|---|
| 3 | A |
| 6 | B |
| 9 | C |
| 12 | D |
| 15 | E |
| 18 | F |
| 21 | G |
| 27 | H |
| 33 | I |
| 39 | J |
| 45 | K |
| 51 | L |
| 54 (outlet) | M |

Table III

| Time, hours:min.: | Outlet gas moisture content (p.p.m.) |
|---|---|
| 0:00 | 2.1 |
| 0:30 | 2.1 |
| 1:00 | 2.1 |
| 1:30 | 2.1 |
| 2:00 | 2.1 |
| 2:40 | 2.1 |
| 3:05 | 2.1 |
| 3:30 | 2.1 |
| 4:00 | 2.1 |
| 4:30 | 2.0 |
| 5:00 | 2.0 |
| 5:05 | 2.0 |
| 5:10 | 2.0 |
| 5:15 | 2.0 |
| 5:20 | 2.0 |
| 5:25 | 2.0 |
| 5:30 | 2.2 |
| 5:35 | 3.0 |
| 5:45 | 8.0 |
| 5:50 | 14.0 |
| 6:00 | 31.0 |
| 6:10 | 65.0 |
| 6:20 | 130 |
| 6:30 | 215 |

It is noted that the effluent break point occurred approximately five hours and thirty minutes after the start of the test. It is apaprent that all twelve sensors were actuated at a time early enough to prevent breakthrough, and that the sensors could each be used at any location in the bed to sense the arrival of the concentration gradient at that point. Thus, the cycle could have been terminated at any point, as might be required to ensure delivery of effluent gas of the proper moisture level.

While the invention has been described with principal emphasis on a desiccant dryer and a process for drying gases, it will be apparent to those skilled in the art that this apparatus with a suitable choice of sorbent can be used for the separation of one or more gaseous components from a gaseous mixture. In such a case, the adsorbed component can also be removed from the sorbent by application of heat, and optionally, in addition, a reduction in pressure, during regeneration. Thus, the process can be used for the separation of hydrogen from petroleum hydrocarbon streams and other gas mixtures containing the same, for the separation of oxygen from nitrogen, for the separation of olefins from saturated hydrocarbons, and the like. Those skilled in the art are aware of sorbents which can be used for this purpose.

In many cases, sorbents useful for the removal of moisture from air can also be used, preferentially to adsorb one or more gas components from a mixture thereof, such as activated carbon, glass wool, adsorbent cotton, metal oxides and clays such as attapulgite and bentonite, fuller's earth, bone char and natural and synthetic zeolites. The zeolites are particularly effective for the removal of nitrogen, hydrogen and olefins, such as ethylene or propylene, from a mixture with propane and higher paraffin hydrocarbons, or butene or higher olefins. The selectivity of a zeolite is dependent upon the pore size of the material. The available literature shows the selective adsorptivity of the available zeolites, so that the selection of a material for a particular purpose is rather simple and forms no part of the instant invention.

In some cases, the sorbent can be used to separate a plurality of materials in a single pass. Activated alumina, for example, will adsorb both moisture vapor and carbon dioxide, in contrast to Mobilbeads which will adsorb only water vapor in such a mixture.

The apparatus employed for this purpose will be the same as that described and shown in FIGURES 2 to 7, inclusive, and the process is also as described, suitably modified according to the proportions of the components to be separated, the operating pressure and temperature and the volume of available sorbent.

It will, however, be understood that the process is of particular application in the drying of gases, and that this is the preferred embodiment of the invention.

Having regard to the foregoing disclosure, the following is claimed as the inventive and patentable embodiments thereof:

1. A process for reducing the concentration of water vapor in a mixture thereof with a second gas to below a limiting maximum concentration thereof in the second gas, which comprises passing the mixture in contact with and from one end to another end of a bed of a sorbent having a preferential affinity for the water vapor, adsorbing water vapor thereon to form a gaseous effluent having a concentration thereof below the maximum, and forming a concentration gradient of water vapor in the bed progressively decreasing from one end to the other end as the adsorption continues, and an increasing concentration of water vapor in the second gas defining a concentration front progressively advancing in the bed from the one end to the other end as sorbent capacity therefor decreases, detecting the advance of substantially the leading edge of the front in the bed by sampling the gas and determining the water vapor content thereof at a predetermined point in the bed sufficiently far from the end of the bed to prevent the front from leaving the bed, and then discontinuing passing the gaseous mixture in contact with the bed before the front can leave the bed and the limiting maximum concentration of water vapor in the second gas can be exceeded.

2. A process in accordance with claim 1 which comprises desorbing water vapor from the bed by passing a purge flow of gas low in concentration of said water vapor in contact with the bed, and then repeating the adsorption and desorption cycles in sequence.

3. A process in accordance with claim 1 which comprises removing sorbed water vapor from the bed at an elevated temperature sufficient to desorb said water vapor.

4. A process in accordance with claim 1 which includes removing sorbed water vapor from the bed at a pressure below the pressure at which adsorption is effected.

5. A process in accordance with claim 1 which includes removing sorbed water vapor from the bed at a pressure below atmospheric.

6. A process in accordance with claim 1 in which the passing of the gaseous mixture in contact with the bed is discontinued automatically when the concentration front has traveled a predetermined distance through the bed.

7. A process in accordance with claim 1 which comprises employing two beds of sorbent, a first of which is on a cycle for adsorption of the water vapor, while the other of which is on a cycle for desorption of the water vapor by a purge flow comprising effluent gas from the first bed.

8. A process in accordance with claim 7 wherein the bed on a desorption cycle is subjected to the purge flow at room temperature.

9. A process in accordance with claim 8 wherein the bed on a desorption cycle is subjected to the purge flow at an elevated temperature sufficient to aid in desorbing said water vapor.

10. A process in accordance with claim 8 wherein the bed on a desorption cycle is subjected to the purge flow at a pressure less than that for the adsorption cycle.

11. Apparatus for reducing the concentration of water vapor in a mixture thereof with a second gas to below a limiting maximum concentration thereof in the second gas, comprising, in combination, a vessel, a chamber therein for a bed of sorbent having a preferential affinity for the water vapor, a line for delivering influent gas at an inlet end of said bed, a line for delivering effluent gas from an outlet end of said bed, probe means in the bed in a position to sample the gas for sensing of water vapor content thereof to detect substantially the leading edge of the front at a predetermined point sufficiently far from the end of the bed to prevent the leading edge of the front from leaving the bed, sensor means in gaseous flow connection with the probe for sensing the concentration of water vapor in the second gas at the probe, and giving a signal in response thereto, at a predetermined concentration of water vapor, and means for closing off the influent flow of gas in response to the signal.

12. Apparatus in accordance with claim 11, wherein the probe is positioned in a central portion of the bed at a point from $\frac{1}{50}$ to $\frac{2}{3}$ of the length of the bed distant from the outlet end thereof.

13. Apparatus in accordance with claim 11 comprising a pair of vessels, each having chambers therein for a bed of sorbent, and each having lines for delivery of influent gas and for delivery of effluent gas, and probe means in a central portion of the bed in gaseous flow connection to a sensor means.

14. Apparatus in accordance with claim 13 comprising means for diverting a portion of effluent gas from the one vessel to the other vessel for purge flow desorption of sorbed water vapor from the bed.

15. Apparatus in accordance with claim 11 comprising means for heating the bed of sorbent in the vessel to an elevated temperature sufficient to aid in desorbing a gas sorbed thereon.

16. Apparatus in accordance with claim 15 wherein the heating means is arranged to heat only that portion of the bed sorbed to at least 20% of its capacity of sorbed gas.

17. Apparatus in accordance with claim 11 comprising means for reducing pressure during desorption to below the pressure during adsorption.

18. Apparatus in accordance with claim 11, wherein the vessel is heaterless.

References Cited

UNITED STATES PATENTS

| 2,211,162 | 8/1940 | Ray et al. | 55—161 X |
|---|---|---|---|
| 2,703,628 | 3/1955 | Pompeo et al. | 55—161 |
| 2,882,244 | 4/1959 | Milton | 55—75 X |
| 3,085,379 | 4/1963 | Kiyonaga et al. | 55—62 X |
| 3,176,444 | 4/1965 | Kiyonaga | 55—62 X |

FOREIGN PATENTS 683,198  3/1964  Canada.

REUBEN FRIEDMAN, *Primary Examiner.*

C. M. DITLOW, *Assistant Examiner.*

U.S. Cl. X.R.

55—33, 62, 163, 275